United States Patent [19]

Bassetti et al.

[11] Patent Number: 4,460,909

[45] Date of Patent: Jul. 17, 1984

[54] METHOD AND APPARATUS FOR ENHANCING THE RESOLUTION OF AN ELECTROPHOTOGRAPHIC PRINTER

[75] Inventors: Larry W. Bassetti; Ross B. Hooker, III; Sherwood Kantor, all of Boulder, Colo.

[73] Assignee: International Business Machines Corporation, Armonk, N.Y.

[21] Appl. No.: 332,382

[22] Filed: Dec. 18, 1981

[51] Int. Cl.$^3$ .......................................... G01D 15/00
[52] U.S. Cl. .................................. 346/160; 346/108; 358/298
[58] Field of Search .................. 346/107 R, 108, 160; 358/300, 293, 298, 296; 178/30; 340/793

[56] References Cited

U.S. PATENT DOCUMENTS

| | | | |
|---|---|---|---|
| 2,962,548 | 11/1960 | Taudt | 178/6.6 |
| 3,573,789 | 4/1971 | Sharp et al. | 340/324 |
| 4,052,715 | 10/1977 | Streifer | 346/160 |
| 4,063,232 | 12/1977 | Fernald | 340/324 |
| 4,079,367 | 3/1978 | Yonezawa et al. | 340/324 |
| 4,232,342 | 11/1980 | Skala | 358/296 |
| 4,232,343 | 11/1980 | Sommer | 358/296 |
| 4,365,275 | 12/1982 | Berman et al. | 358/298 X |

FOREIGN PATENT DOCUMENTS

| | | |
|---|---|---|
| 3025089 | 8/1981 | Fed. Rep. of Germany . |
| 3035440 | 9/1981 | Fed. Rep. of Germany . |
| 2033844 | 5/1980 | United Kingdom . |

OTHER PUBLICATIONS

IBM Technical Disclosure Bulletin, vol. 23, No. 11, Apr. 1981, entitled "High Resolution Display and Printing Technique," by Y. L. Yao, pp. 5225-5226.

IBM Technical Disclosure Bulletin, vol. 20, No. 1, Jun. 1977, entitled "Gray Scale to Pseudo Halftone Conversion," by A. L. Mix, Jr. et al., pp. 31-32.

Xerox Disclosure Journal, vol. 6, No. 1, Jan./Feb. 1981, entitled "Character Edge Smoothing for Matrix Printing," by D. L. Ort. p. 19.

IBM Technical Disclosure Bulletin, vol. 21, No. 2, Jul. 1978, pp. 729-730, entitled "Low Resolution Print Quality Enhancement," by J. E. Garcia.

*Primary Examiner*—Thomas H. Tarcza
*Attorney, Agent, or Firm*—C. E. Rohrer; H. L. Knearl

[57] ABSTRACT

This invention relates to enhancing the apparent resolution of electrophotographic printers. This is accomplished by writing a gray of half-tone halo along the periphery of images written on the photoconductor. When the image with its half-tone halo is developed, transferred and fixed by steps in the electrophotographic process, the printed image has a substantially smooth contour. In effect, the gray halo placed around the image merges with the black interior of the image when the image is developed, transferred and fixed. To prevent the image from appearing to be too thick after its contour has been smoothed by the use of the half-tone halo, the number of black picture elements used to write the image on the photoconductor are reduced. Also, the width of image segments making up the image may be adjusted by changing the level of gray used to write the half-tone halo.

31 Claims, 9 Drawing Figures

METHOD AND APPARATUS FOR ENHANCING THE RESOLUTION OF AN ELECTROPHOTOGRAPHIC PRINTER

FIELD OF THE INVENTION

This invention relates to printers using the electrophotographic or xerographic process. More particularly it relates to enhancing the apparent resolution of such printers.

BACKGROUND OF THE INVENTION

Xerographic printers print text by using a light beam to write characters on a photoconductor. The text image is then developed, transferred to paper and fixed by the normal xerographic process. Usually, the light beam is a laser beam and writes white or black dots on the photoconductor by directing the light beam to the photoconductor or by intercepting it.

The resolution of most electrophotographic printers available today is about 100 pels per cm where a pel is a picture element (black or white dot). At this resolution, horizontal and vertical strokes or image segments print with very little visible distortion. However, diagonal image segments print with a staircase distortion which is quite visible to the human eye.

In the past this staircase distortion has been eliminated by going to a higher print resolution or by shifting pels a half pel position when printing diagonals. Using a higher print resolution is a straight forward but very expensive solution. The light source (laser) and the optics must be higher quality and thus are significantly more expensive.

Shifting the pels one half position when printing diagonals is a well known technique and is described for example in the article entitled "Character Edge Smoothing For Matrix Printing" by D. L. Ort in the Xerox Disclosure Journal, Volume 6 Number 1, January/February 1981.

A more precise technique which shifts selected pels one half pel position is taught in U.S. Pat. No. 4,232,343 entitled "Method and Apparatus For Recording Graphic or Image Information By Means of Punctiform Recording Spots" and issued to R. Sommer. In this patent a pel is shifted or not shifted depending on its relative position to the desired contour.

The difficulty with shifting pels one half position is that it only partially reduces the staircase distortion.

SUMMARY OF THE INVENTION

This invention has solved the problem of low resolution distortion in electrophotographic printers by writing a gray or half-tone halo along the periphery of images written on the photoconductor. When the image with its half-tone halo is developed, transferred and fixed by steps in the electrophotographic process, the printed image has a substantially smooth contour. In effect, the gray halo placed around the image merges with the black interior of the image when the image is developed, transfered and fixed.

As another feature of the invention, the number of black picture elements (pels) used to write the image on the photoconductor are reduced. This keeps the image from appearing to be too thick after its contour has been smoothed by the use of the half-tone halo.

As yet another feature of the invention, the width of image segments making up the image may be adjusted by the level of gray used to write the half-tone halo.

The great advantage of our invention is that with minimal additional hardware expense, the effective resolution of a 100 pel per cm xerographic printer will produce a printed result approaching that of a 150 pel per cm printer. At this higher resolution, the staircase distortion is not visible to the human eye.

BRIEF DESCRIPTION OF DRAWINGS

The invention is described in detail below with reference to drawings, illustrating a specific embodiment of the invention, in which.

DETAILED DESCRIPTION

Figure 1:
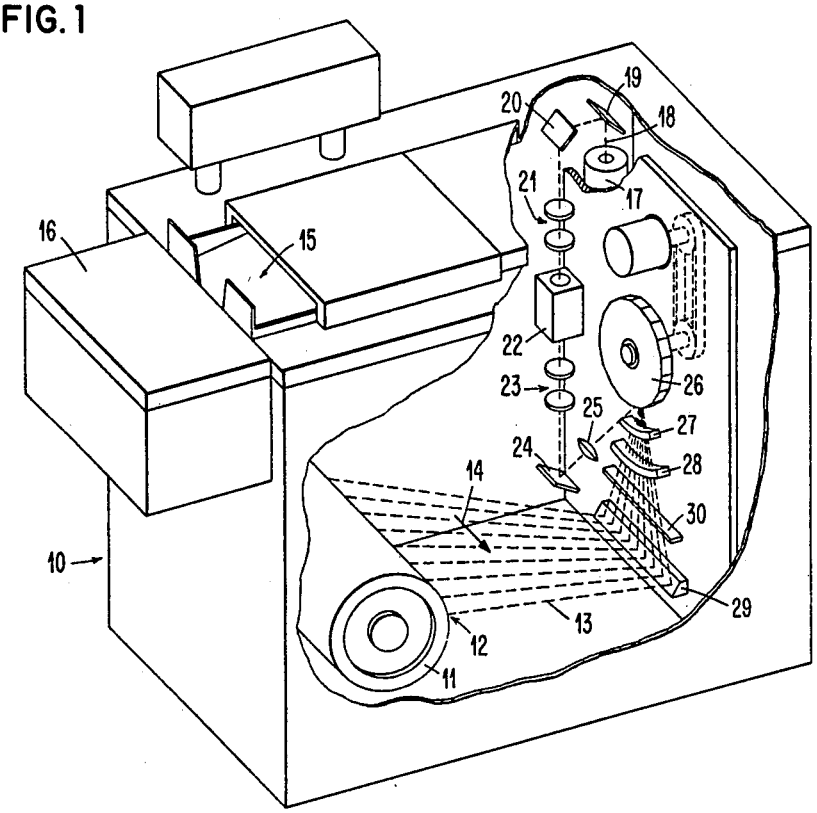
FIG. 1 shows one example of an electrophotographic printer than can be operated in accordance with the present invention.
Figure 2:
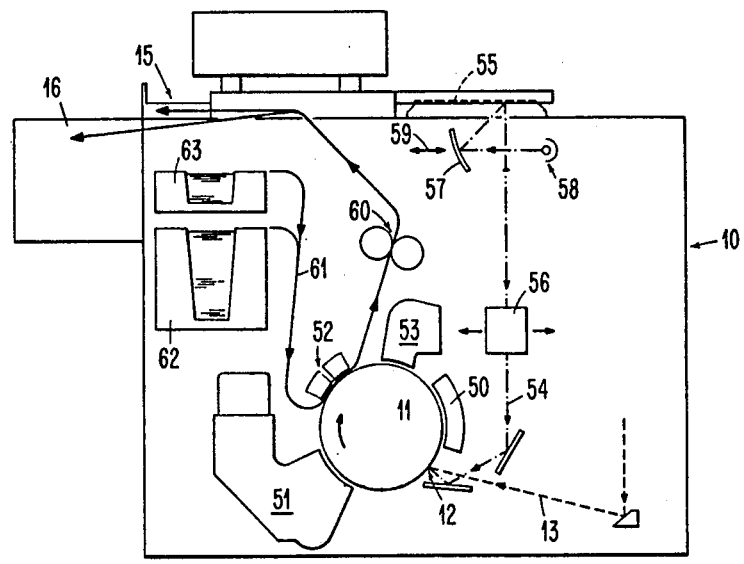
FIG. 2 shows the printer of FIG. 1 functioning in an alternative mode as a copier.

FIGS. 1 and 2 show a copier/printer electrophotographic apparatus 10 that can be operated in accordance with the present invention.

Details of electrophotographic apparatus are well known to those skilled in the art and form no part of this invention. It is to be understood that a variety of techniques exists for performing the various electrophotographic functions identified.

To review briefly the electrophotographic or xerographic functions, reference is now made to FIG. 2. Apparatus 10 includes a photoconductor drum 11 providing an image receiving photoconductor surface. Drum 11 is rotated past a charging station 50, an exposure station 12, a development station 51, a transfer station 52 and a cleaning station 53. At the exposure station the uniform electrical charge which was applied to the photoconductor at the charging station is selectively dissipated. In the copy mode, this charge dissipation is accomplished by a reflected footprint of light 54. In the print mode this charge dissipation is accomplished by a binary (i.e., on/off) light beam 13 that traverses path 14 (FIG. 1) extending parallel to the drum's axis of rotation.

In the copy mode, footprint 54 extends a substantial axis portion of drum 11 and is operable to discharge the photoconductor in accordance with the reflectance characteristic of a stationary original document 55. Document 55 is line-scanned by movable lens 56 and reflector 57. Light source 58 cooperates with reflector 57 to illuminate the original document with a footprint of light. This light footprint extends normal to scan direction 59.

In the print mode, the photoconductor is exposed by laser beam 13 in FIGS. 1 and 2. Selective photoconductor exposure by beam 13 generates discrete areas of an electrostatic latent image consisting of discharged areas (defined as background areas) and charged areas (defined as image areas). The background areas will not attract toner when passing through developer 51 (FIG. 2), whereas the image areas will be toned.

The photoconductor's latent image, in either the copy or print mode, is presented to development station 51 (FIG. 2) where colored themoplastic resin powder or toner is selectively deposited on only the charged image areas. Thereafter the developed image is transferred to a paper sheet, as by elecrostatic force, at transfer station 52. The printed sheet is then passed through fixing station 60 in the form of a hot roll fuser where heat, or other suitable means, temporarily liquifies the toner, causing it to adhere to the sheet and to form a permanent image thereon. The sheet is then delivered to exit pocket or tray 15, or to bin 16 (FIG. 1), where it can be removed. Any toner remaining on the photoconductor, as it leaves the transfer station, is removed from the photoconductor at the cleaning station prior to the recharging of the photoconductor. Paper is selectively supplied to sheet path 61 from a primary bin 62 or a secondary bin 63 where stacks of cut sheets are stored with their length dimension oriented normal to the direction of sheet feed.

With reference to FIG. 1, light beam 13 is preferably generated from a source of high energy coherent light, such as a continuous mode helium-neon laser 17 that projects a beam 18 along an optical path through mirrors 19 and 20, compression optics 21, acousto-optic laser beam modulator 22, expansion optics 23, mirror 24, lens 25, rotating scanning mirror 26, lens 27, projection lens 28, mirror 29 and beam blocking knife edge 30, to the photoconductor drum.

Modulator 22 is an acousto-optic Bragg effect device known to those skilled in the art. The modulator responds to the binary state (1 or 0) of a control information bit to thereby modulate beam 18 in either of two closely adjacent but slightly different output paths. One beam is the deflected first order beam. The other beam is the undeflected zero order beam.

A zero frequency signal applied to modulator 22 results in not excitation of modulator 22, and only a zero order beam is produced. When a first order frequency is applied to modulator 22, the modulator is energized, and a portion of the beam is deflected to produce a first order beam. A first order beam will ultimately be directed past knife edge 30 and will strike the photoconductive surface as beam 13 (FIG. 1) to discharge the photoconductor and thereby ultimately cause a background area (an untoned area) to be produced on the printed sheet. A zero order beam is intercepted by knife edge 30 and thus does not strike the photoconductor. The resulting undischarged photoconductor area will attract toner at the developing station, to thus form part of the colored image on the copy sheet.

Figure 3A:
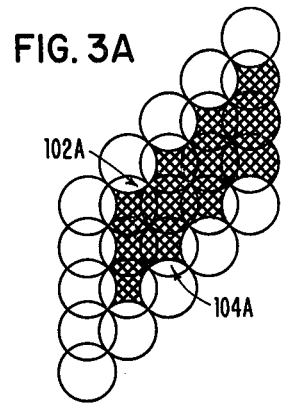
FIG. 3A shows the dot pattern written on a photoconductor by beam 13 in FIG. 1.

Referring now to FIG. 3A, one example of a dot pattern written by laser beam 13 on the photoconductor is shown. Because the entire photoconductor is charged and the laser writes white background, the shaded dots in FIG. 3A represent areas of a photoconductor not illuminated by the laser beam. Thus, the shaded dots in FIG. 3A are still charged and may be developed and printed as the electrophotographic image.

Figure 3B:
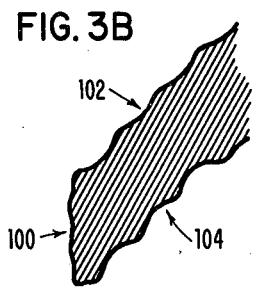
FIG. 3B shows the outline of the image developed and printed from the dot pattern in FIG. 3A.

The image developed and printed from the dot pattern in FIG. 3A is shown in FIG. 3B. The dot pattern represents a portion of a 45 degree angular segment. The contour of the image in FIG. 3B exhibits the well known staircase effect produced by low resolution printers. Segment end 100 has a relatively smooth contour because the corresponding dot pattern in FIG. 3A approximates a straight vertical edge. On the 45 degree slopes 102 and 104 of the image, the staircase contour results from the discontinuities in the dot pattern on slopes 102A and 104A in FIG. 3A.

Figure 4A:
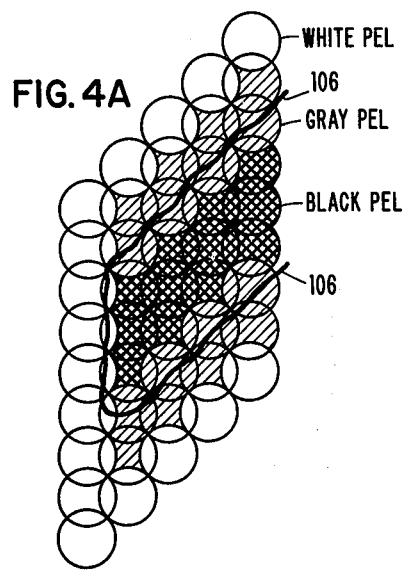
FIGS. 4A and 4B show the dot pattern and image outline, respectively, produced by the electrophotographic printer of FIG. 1 when operated in accordance with the present invention.
Figure 4B:
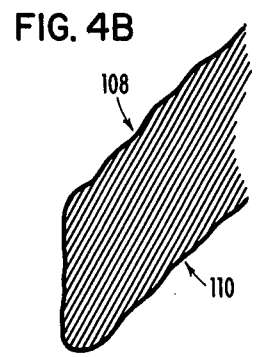

FIGS. 4A and 4B illustrate an improved dot pattern and corresponding printed image for an angular stroke or segment written and printed in accordance with the present invention. As shown in FIG. 4A, each vertical section through the stroke contains two gray pels (illustrated by lightly shaded circles), three black pels (heavily shaded) and two more gray pels. Since beam 13 (FIG. 1) writes from top to bottom each column of the stroke is written as three black pels preceded by two gray pels and succeeded by two gray pels. If equipotential lines were drawn on the photoconductor around the stroke, these lines would have relatively smooth contours because of the presences of the gray pels. Line 106 in FIG. 4A represents such an equipotential line within which there is sufficient charge that the xerographic process will develop an image.

FIG. 4B shows the developed printed image produced by the black and gray pel pattern in FIG. 4A. Comparing FIG. 4B with FIG. 3B, the staircase pattern at slopes 102 and 104 in FIG. 3B does not appear in smooth slopes 108 and 110 in FIG. 4B. However, it is also apparent by comparing FIGS. 3B and 4B that the vertical width or thickness of the stroke has been increased by about one pel. In some printing applications, the additional thickening or width increase of the stroke may not be desirable.

Figure 5A:
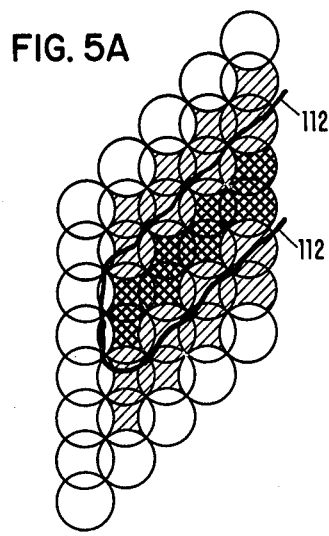
FIGS 5A and 5B show a dot pattern and image outline similar to those shown in FIGS. 4A and 4B except that the vertical width of the image segment has been decreased by one pel.
Figure 5B:
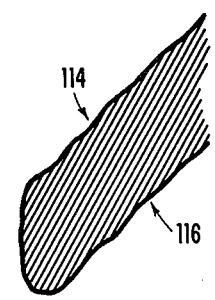

FIGS. 5A and 5B are another example of an angular image segment printed in accordance with the invention except now the vertical segment width in FIG. 5B is substantially the same as the vertical segment width in FIG. 3B. This is accomplished by eliminating one of the black pels in the writing of the segment on the photoconductor. Comparing FIGS. 3A and 5A, the three black pels have been reduced to two in FIG. 5A. The black pels in FIG. 5A are still surrounded by two gray pels just as in FIG. 4A. The resultant equipotential line 112 in FIG. 5A follows the same path as in FIG. 4A, except that the vertical separation between the upper and lower sections of equipotential line 112 is less.

Comparing FIG. 5B to FIG. 3B, slopes 114 and 116 are much smoother than slopes 102 and 104. In addition, the vertical thickness of the segment is substantially the same in both FIGS. 3B and 5B. Accordingly, the printed dot pattern of FIG. 5A is the preferred dot pattern to eliminate the staircase printed image contour on slopes 102 and 104 in FIG. 3B.

Figure 6:
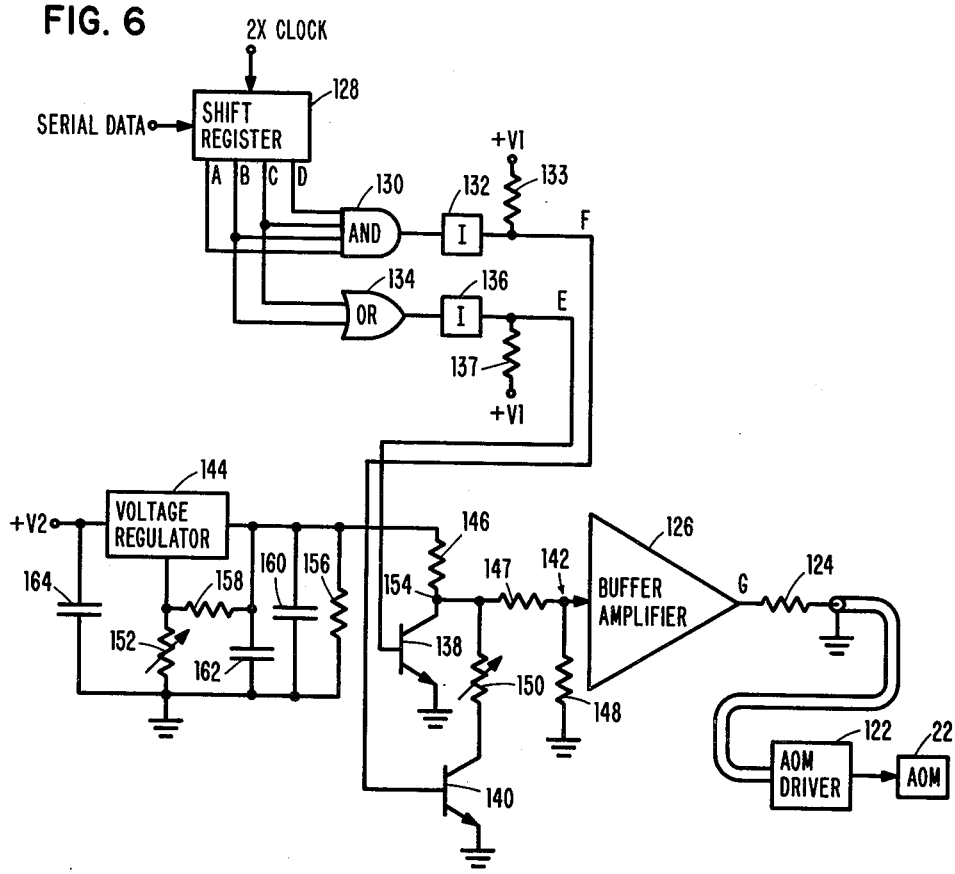
FIG. 6 shows a circuit for controlling the beam modulator in FIG. 1 to operate the electrophotographic printer in accordance with the present invention.
Figure 7:
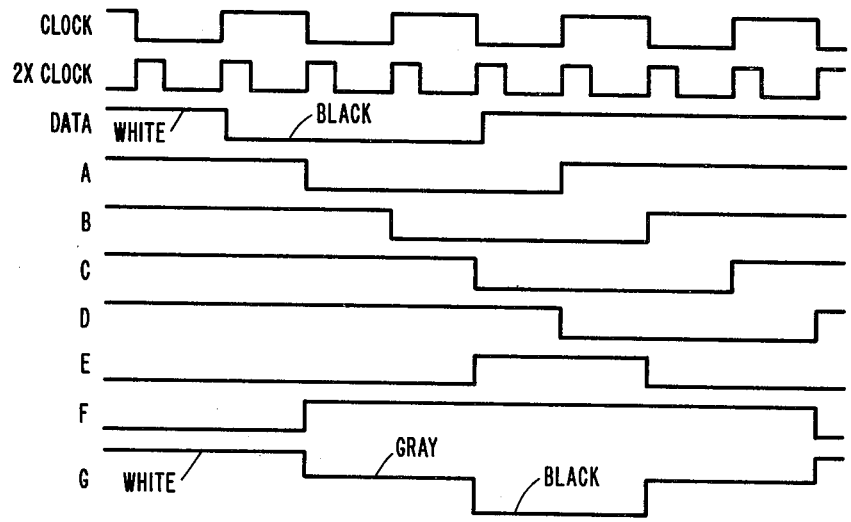
FIG. 7 shows the timing diagram of signals occurring at correspondingly labeled signal points in the circuit of FIG. 6.

FIG. 6 shows the preferred embodiment of the invention to control the laser writing beam 13 of FIG. 1 to write the pattern in FIG. 5A. The embodiment in FIG. 6 is most easily understood by also referring to the waveforms in FIG. 7. Signals illustrated in the timing diagram in FIG. 7 are identified by the same label in FIG. 6 at the electrical lines on which they occur.

The circuit in FIG. 6 converts the two-level, serial data signal into a three-level serial signal which may be used to control the acousto-optic modulator (AOM) 22 in FIG. 1. Modulator 22 operates as previously described in FIG. 1, but in addition, the amount of energy in the first order beam is controlled. Accordingly, the first order beam may be used to write white and gray depending upon the amount of energy in the beam, while the zero order beam is still blocked to write black.

One example of an acousto-optic modulator that could be used with the present invention is the Model 1205-603D available from Isomet Corporation. An AOM driver that can be used to convert the three level signal into the zero frequency signal or the first order frequency signal with two selected amplitudes is the AOM Driver Model H-214 available from Harris Corporation. The amplitude of the first order frequency controls the intensity of the first order beam. The three level waveform to generate white, gray and black pels is waveform G in FIG. 7 which is supplied to AOM driver 122 in FIG. 6. Resistor 124 is merely an impedance matching resistor for the cable connection between buffer amplifier 126 and the AOM driver 122.

To generate the three level signal G from the serial data, the serial data is first applied to a shift register 128 in FIG. 6. The data signal is divided into bit intervals (one bit for each pel) by each transition of the clock signal in FIG. 7. Thus, in FIG. 7, the data signal contains three black pels. The 2× clock pulses applied to shift register 128, shift these three black bits through the register producing signal waveforms A, B, C and D, each serially delayed from the preceding signal by one bit interval.

To control modulator 22 to write gray pels, the signal waveforms A, B, C and D are monitored by And circuit 130, and the resultant signal is inverted by inverter 132 to produce the F signal in FIG. 7. The F signal is the gray pels signal. When the F signal is at an up level, the circuit of FIG. 6 will generate a gray pel writing signal for driver 122 unless the black pel signal is also present. Because the F signal is an And invert signal derived from waveforms A, B, C and D, signal F will be at an up level if there is a down level at any of the inputs of And circuit 130. In effect, the F signal goes up as soon as a black pel enters the shift register 128 and does not drop back down until all black pels have left the shift register 128.

To control modulator 22 to write black pels, OR circuit 134 monitors the two center taps B and C of shift register 128. The output of OR circuit 134 is inverted by inverter 136 to generate the E signal. Accordingly, the E signal will be down unless both inputs to OR circuit 134 are down. The E signal is the black pel signal and is reduced in width by one pel (one clock bit interval) relative to the input data signal.

By combining the E signal with the F signal, the edge or transition between image bits and background bits can be detected, and half-tone bits can be generated adjacent the edge of the image. The transition between image and background corresponds to the edges of the E signal. The number of half-tone bits generated at the image edge depends on how many bit intervals of the F signal extend past the edges of the E signal.

The E signal, black, and F signal, gray, are combined in the G signal by switching transistors 138 and 140. The on/off condition of transistors 138 and 140 controls the level of voltage at node 142. The signal at node 142 is the input signal to buffer amplifier 126. Since the gain of amplifier 126 is one, the signal at node 142 is the same as the G signal. The voltage at node 142 is defined by the line reference voltage provided by voltage regulator 144 and the voltage dividing action of resistors 146, 147, 148 and 150.

The E and F signals along with the bias voltage V1 and bias resistors 133 and 137 control the on/off condition of transistors 138 and 140 respectively. When both the E and F signals are at a down level, transistors 138 and 140 are off. The voltage from the regulator 144 is then divided across resistors 146, 147 and 148. The voltage at node 142 in this condition is the white level voltage in signal G. This white level voltage is adjustable by adjusting variable resistor 152 connected to voltage regulator 144.

When the gray pel signal F rises, transistor 140 turns on. A portion of the current previously passing through resistor 148 is now diverted down through resistor 150 to ground. This drops the voltage at node 142 to the gray level in waveform G. The gray level may be adjusted by adjusting the resistance in variable resistor 150. Typically, the gray voltage is about six tenths of the white voltage.

The background (white) or half-tone (gray) level voltages set AOM driver 122 to generate the first order frequency signal. Changing between background and half-tone level voltages changes the amplitude of the first order frequency and thereby sets the intensity of the first order beam for white or half-tone exposure of the photoconductor. Thus, by adjusting resistor 150, the intensity of the beam when writing the half-tone halo may be adjusted.

When the black pel signal E comes up, transistor 138 turns on. This holds node 154 near ground and thus drops the voltage at node 142 near ground. With node 142 near ground, the level of the G signal drops to the black level.

The reference voltage provided by voltage regulator 144 is filtered and controlled by the resistors and capacitors attached to its input and output. Resistor 156 is a load resistor. Resistors 152 and 158 provide voltage division feedback to the regulator to adjust the voltage out of the regulator. Capcaitors 160 and 162 operate as filters on the output of regulator 144. Two capacitors are used because of their different frequency responses. One can be used to filter out very high frequencies and the other used to filter out the lower frequencies. As a result, the output of the regulator 144 is essentially a DC level. Transients on the input voltage V2 to the regulator are filtered out by capacitor 164.

A review of FIG. 7 signals indicates that the circuit in FIG. 6 has converted data signal into a three-level, white-gray-black signal G. Further, the number of bits (pels) in the black level in signal G is one less than the number of bits in the black level for the data signal. Thus, as explained for FIGS. 5A and 5B, the printed image segments will not appear to be too thick. Also, it is apparent in the G signal in FIG. 7 that the gray level extends for two bits on either side of the black level in signal G. As previously explained these gray bits smooth the contour of the printed image.

If the gray level in signal G is varied by adjusting resistor 150 in FIG. 6, the effect on the printed image is to increase the thickness or width of the segments in the image. Accordingly, if the printed image in FIG. 5B does not have the desired thickness, it could be adjusted by adjusting resistor 150 in FIG. 6. This has the effect of moving the equipotential line 112 in FIG. 5A.

As previously described, the circuit in FIG. 6 reduces the width of the segment by one black pel. If this is not desired, the one wished to print as illustrated in FIGS. 4A and 4B, then the data signal would also be connected to AND circuit 130. In addition, the C tap would not be passed through OR circuit 134. Instead the B tap from shift register 128 would be connected directly to inverter circuit 136. Thus, And circuit 130 would receive inputs, A, B, C and D plus the data signal, to generate the F signal, and B would be connected directly to inverter circuit 136 to generate the E signal.

While we have illustrated and described the preferred embodiment of our invention, it is understood that we do not limit ourselves to the precise constructions herein disclosed and the right is reserved to all changes and modifications coming within the scope of the invention as defined in the appended claims.

What is claimed is:

1. In an electrophotographic printer having a light source for writing black/white images on the photoconductor, means for developing that image, and means for fixing the image on paper, improved apparatus for enhancing the apparent resolution of the image printed on the paper, said apparatus comprising:
   means for modulating the light from said light source so that black, white or at least one level of gray is produced at each picture element (pel) location on the photoconductor, said locations spatially separated such that each pel partially overlaps directly adjacent pels;
   first means for controlling said modulating means to produce black pels on the photoconductor for each image to be printed on the paper; and
   second means for controlling said modulating means to produce gray pels on the photoconductor directly adjacent and overlapping with those black pels defining an edge of said image, said gray pels having the effect of smoothing the contour of the black image printed on paper.

2. The apparatus of claim 1 wherein said second controlling means comprises:
   detecting means for monitoring the print data to detect the first black pel and the last black pel in a series of black pels to be produced on the photoconductor by said modulating means modulating the light from said light source; and
   means responsive to said detecting means for generating a gray pel print signal for said modulating means for a predetermined number of pels preceding the first black pel in the series and for a predetermined number of pels succeeding the last black pel in the series.

3. The apparatus of claim 2 wherein said first controlling means comprises:
   monitoring means for monitoring the print data for each series of black pels to be produced on the photoconductor;
   reducing means responsive to said monitoring means for reducing the number of black pels in the series by a predetermined number; and
   means responsive to said reducing means for generating a black pel print signal for said modulating means to print the reduced series of black pels.

4. The apparatus of claim 1 wherein said light source is a laser and wherein said modulating means modulates the beam of light from said laser to generate a first beam to produce black pels and a second beam having two intensities, one to produce white pels and the other to produce gray pels.

5. The apparatus of claim 4 wherein said second controlling means comprises:
   detecting means for monitoring the print data to detect the first black pel and the last black pel in a series of black pels to be produced on the photoconductor by said modulating means;
   means responsive to said detecting means for generating a gray pel print signal for said modulating means for two pels preceding the first black pel in the series and two pels succeeding the last black pel in the series; and
   said modulating means responsive to said gray pel print signal to produce two gray pels adjacent the edges of the black image.

6. The apparatus of claim 5 wherein said first controlling means comprises:
   monitoring means for monitoring the print data for each series of black pels to be produced on the photoconductor;
   means responsive to said monitoring means for generating black pel print signals; and
   said modulating means responsive to said black pel print signals for producing the series of black pels.

7. The apparatus of claim 5 wherein said modulating means comprises:
   means responsive to said black pel print signals for producing a first beam to produce black pels on the photoconductor;
   means responsive to the absence of said black pel print signals for producing a second beam for producing white pels on the photoconductor; and
   means responsive to said gray pel print signals for producing a third beam to produce a discharge level on the photoconductor to produce gray pels rather than white pels.

8. The apparatus of claim 7 and in addition:
   means for adjusting the intensity of said third beam whereby the level of gray written can be adjusted.

9. The apparatus of claim 5 wherein said first controlling means comprises:
   monitoring means for monitoring the print data for each series of black pels to be produced on the photoconductor;
   means responsive to said monitoring means for reducing the number of black pels in the series of black pels by one and generating black pel print signals for the reduced series of black pels; and
   said modulating means responsive to said black pel print signals for producing the reduced series of black pels.

10. Method for enhancing the apparent resolution of an electrophotographic printer by smoothing the contour of the printed image on the printed document, said method comprising the steps of:
    writing discrete picture elements in overlapping relationship on the photoconductor of the electrophotographic printer with a light beam to produce an image on a background;
    utilizing said light beam to write additional pels in overlapping relationship with those pels defining an edge of said image to produce a half-tone halo on the photoconductor on at least one side of said image; and
    developing the image on the photoconductor, the developed image having a relatively smooth contour due to the presence of the half-tone halo.

11. The method of claim 10 wherein said writing step comprises the steps of:

reducing the segment width of the image to be produced on the photoconductor; and exposing the photoconductor with the light beam in accordance with the reduced segment width.

12. The method of claim 10 wherein said utilizing step comprises the steps of:

detecting the edge between image and background; and adjusting the discharge level of the photoconductor to a level for producing a half-tone on the photoconductor partially overlapping the edge of the image.

13. The method of claim 10 wherein said document is printed from binary print data where each data bit represents either background or image data and said utilizing step comprises the steps of:

detecting the transition between background data and image data;

generating a predetermined number of half-tone data signals to partially overlap with image data signals at a transition between image and background, at least some of said half-tone data signals replacing background data signals, the half-tone signal representing a discharge level for the photoconductor which is between the discharge level for image and the discharge level for background; and producing the half-tone discharge level at each transition between image and background whereby a half-tone halo is written on the photoconductor partially overlapping the image so that the contour between image and background is smoothed on the document being printed.

14. The method of claim 13 and in addition the step of:

adjusting the half-tone discharge level so that the width of the image being printed is adjusted.

15. The method of claim 13 wherein the predetermined number of half-tone data signals in said generating step is two, one of which replaces an edge image data signal.

16. The method of claim 13 wherein said image writing step comprises the steps of:

reducing by one the number of image data bits across the width of each segment of the image being written on the photoconductor as long as said number of image data bits is greater than one; and exposing the photoconductor with the light beam in accordance with the reduced number of image data bits for each segment whereby the reduced width image written with halo on the photoconductor will be developed and fixed on the printed document as an image with substantially the same width as a non-reduced image written without halo on the photoconductor.

17. In an electrophotographic printer having a light source for writing black/white images on the photoconductor, means for developing that image, and means for fixing the image on paper, improved apparatus for enhancing the apparent resolution of the image printed on the paper, said apparatus comprising:

means for modulating the light from said light source so that black, white or at least one level of gray is written at each picture element (pel) location on the photoconductor;

first means for controlling said modulating means to write black pels on the photoconductor for each image to be printed on the paper;

second means for controlling said modulating means to write gray pels on the photoconductor adjacent the edge of each black image on the photoconductor, said gray pels have the effect of smoothing the contour of the black image printed on paper;

detecting means for monitoring the print data to detect the first black pel and the last black pel in a series of black pels to be written on the photoconductor by said modulating means modulating the light from said light source; and means responsive to said detecting means for generating a gray pel print signal for said modulating means for a predetermined number of pels preceding the first black pel in the series and for a predetermined number of pels succeeding the last black pel in the series.

18. The apparatus of claim 17 wherein said first controlling means comprises:

monitoring means for monitoring the print data for each series of black pels to be written on the photoconductor;

reducing means responsive to said monitoring means for reducing the number of black pels in the series by a predetermined number; and means responsive to said reducing means for generating a black pel print signal for said modulating means to print the reduced series of black pels.

19. In an electrophotographic printer having a light source for writing black/white images on the photoconductor, means for developing that image, and means for fixing the image on paper, improved apparatus for enhancing the apparent resolution of the image printed on the paper, said apparatus comprising:

means for modulating the light from said light source so that black, white or at least one level of gray is written at each picture element location on the photoconductor;

first means for controlling said modulating means to write black pels on the photoconductor for each image to be printed on the paper;

second means for controlling said modulating means to write gray pels on the photoconductor adjacent the edge of each black image on the photoconductor, said gray pels have the effect of smoothing the contour of the black image printed on paper;

said light source is a laser and wherein said modulating means modulates the beam of light from said laser to generate a first beam to write black pels and a second beam having two intensities, one to write white pels and the other to write gray pels; and detecting means for monitoring the print data to detect the first black pel and the last black pel in a series of black pels to be written on the photoconductor by said modulating means.

20. The apparatus of claim 19 wherein said first controlling means comprises:

monitoring means for monitoring the print data for each series of black pels to be written on the photoconductor;

means responsive to said monitoring means for generating black pel print signals; and said modulating means responsive to said black pel print signals for writing the series of black pels.

21. The apparatus of claim 19 wherein said modulating means comprises:

means responsive to said black pel print signals for producing a first beam to write black pels on the photoconductor;

means responsive to the absence of said black pel print signals for producing a second beam for writing white pels on the photoconductor; and means responsive to said gray pel print signals for producing a third beam to produce a discharge level on the photoconductor to write gray pels rather than white pels.

22. The aparatus of claim 21 and in addition:
means for adjusting the intensity of said third beam whereby the level of gray written can be adjusted.

23. The apparatus of claim 19 wherein said first controlling means comprises:
monitoring means for monitoring the print data for each series of black pels to be written on the photoconductor;

means responsive to said monitoring means for reducing the number of black pels in the series of black pels by one and generating black pel printed signals for the reduced series of black pels; and said modulating means responsive to said black pel print signals for writing the reduced series of black pels.

24. Method for enhancing the apparent resolution of an electrophotographic printer by smoothing the contour of the printed image on the printed document, said method comprising the steps of:
writing the image on the photoconductor of the electrophotographic printer with a light beam;

writing a half-tone halo on the photoconductor around the image with the light beam;

developing the image on the photoconductor, the developed image having a relatively smooth contour due to the presence of the half-tone halo written around the image on the photoconductor;

reducing the segment width of the image to be written on the photoconductor; and exposing the photoconductor with the light beam in accordance with the reduced segment width.

25. Method for enhancing the apparent resolution of an electrophotographic printer by smoothing the contour of the printed image on the printed document, said method comprising the steps of:
writing the image on the photoconductor of the electrophotographic printer with a light beam;

writing a half-tone halo on the photoconductor around the image with the light beam;

developing the image on the photoconductor, the developed image having a relatively smooth contour due to the presence of the half-tone halo written around the image of the photoconductor;

said document is printed from binary print data where each data bit represents background or image and said half-tone writing step comprises the steps of:

detecting the transition between background data and image data;

generating a predetermined number of half-tone data signals at each transition between image and background, the half-tone signal representing a discharge level for the photoconductor which is between the discharge level for image and the discharge level for background;

producing the half-tone discharge level at each transition between image and background whereby a half-tone halo is written on the photoconductor adjacent the image so that the contour between image and background is smoothed on the document being printed; and adjusting the half-tone discharge level so that the width of the image being printed is adjusted.

26. Method for enhancing the apparent resolution of an electrophotographic printer by smoothing the contour of the printed image on the printed document, said method comprising the steps of:
writing the image on the photoconductor of the electrophotographic printer with a light beam;

writing a half-tone halo on the photoconductor around the image with the light beam;

developing the image on the photoconductor, the developed image having a relatively smooth contour due to the presence of the half-tone halo written around the image on the photoconductor;

said document is printed from binary print data where each data bit represents background or image and said half-tone writing step comprises the steps of:

detecting transition between background data and image data;

generating a predetermined number of half-tone data signals at each transition between image and background, the half-tone signal representing a discharge level for the photoconductor which is between the discharge level for image and the discharge level for background;

producing the half-tone discharge level at each transition between image and background whereby a half-tone halo is written on the photoconductor adjacent the image so that the contour between image and background is smoothed on the document being printed;

reducing by one the number of image data bits across the width of each segment of the image being written on the photoconductor as long as said number of imge data bits is greater than one; and exposing the photoconductor with the light beam in accordance with the reduced number of image data bits for each segment whereby the reduced width image written with halo on the photoconductor will be developed and fixed on the printed document as an image with substantially the same width as a non-reduced image written without halo on the photoconductor.

27. The apparatus for enhancing edges of graphic images represented by discrete picture elements in overlapping relationship, foreground pel signals to be presented on a background represented by background pel signals, each foreground pel having a first visual characteristic, each background pel having a second visual characteristic which is substantially optically different from said first visual characteristic, the edges of said graphic images being defined by pel areas in which both foreground and background visual characteristics are presented by the overlapping pel structure;
including in combination:
first circuit means for supplying a series of said pel signals representative of a graphic image and its background to be visually presented;

pel signal analysis means coupled to said first circuit means for receiving said pel signals and grouping same into two types of groups, a first type of said groups having signals representing said foreground and said background pels, a second type of said groups having signals representing said background pels and intermediate pels having a third visual characteristic which is substantially optically intermediate said first and second visual characteritics;

output means; and second circuit means coupled to said output means and to said analysis means for receiving the two groups of signals and being responsive to produce output pel signals and for supplying said output pel signals to said output means, said output pel signals having either said first, second, or third characteristic, pel signals with said third visual characteristic being generated between pel signals having the first or second characteristic.

28. In a graphics presentation device having an array of addressable pel locations for visually presenting graphic images consisting of pel activations at predetermined ones of said pel locations, means for generating an image represented by said pels and coupled to said means for visually presenting the generated image, improved apparatus for enhancing the apparent resolution of the visually presented image, comprising:

first circuit means for supplying pel representing signals in an array representative of a graphic to be visually presented;

second circuit means coupled to the first circuit means for receiving said pel representing signals for supplying such signals to said addressable pel locations so that either a first, second or at least one level of visual property intermediate said first and second visual properties is produced at each said addressable pel locations;

third circuit means coupled to said first and second circuit means for controlling said second circuit means to produce said first visual property pels in said addressable pel locations for each image to be visually presented; and fourth circuit means coupled to said first and second circuit means for controlling said second circuit means to produce said intermediate pels in the addressable pel locations which are said addressable pel locations having a first visual property pel overlapping with a second visual property pel, whereby said intermediate pels have the effect of smoothing the contour of the presented image whereby edges of the graphic images have modified visual characteristics.

29. Graphics-indicating electrically-sensible indicia for enabling a graphics presentation device to produce visual graphic images having visually enhanced edges wherein said indicia are arranged as an array of foreground pel-indicating indicia for indicating graphic images to be presented and background pel-indicating indicia for indicating background areas adjacent said indicated graphic images, a graphic image edge being indicatable by overlapping adjacent foreground and background pel-indicating indicia;

the improvement including:

pel-modifying indicia spatially associable with adjacent foreground and background pel-indicating indicia, respectively, for indicating intermediate levels for pels to be visually presented, said intermediate levels being half-tone with a reflectance intermediate said foreground and background pels; and said pel-modifying indicia indicating intermediate levels for a plurality of pels at said graphic image edge.

30. In a machine-implemented method of generating control indicia for adjusting edges of pel-type graphic elements to be visually presented wherein the graphic elements are represented by foreground pel-indicating indicia and a background to the graphic elements is represented by background pel-indicating indicia and wherein said indicia are juxtaposed in a predetermined logical array pattern of such indicia for enabling a two-dimensional graphics presentation corresponding to said logical array pattern, said indicia including gray pel-indicating indicia;

the method, including the machine-implemented steps of:

scanning said indicia in said logical array pattern for identifying adjacent pel-indicating indicia, said adjacent indicia having the property of both said indicia that respectively indicate a foreground and a background pel in overlapping relationship;

changing a predetermined number of indicia in said logical array pattern with respect to said adjacent indicia to gray pel-indicating indicia; and supplying said foreground, background and gray pel-indicating indicia in said logical array to an output terminal as a control element for a visual presentation device.

31. In a machine-implemented method of generating control indicia for adjusting edges of pel array constituted graphic elements to be visually presented wherein the graphic elements are represented by foreground pel-indicating indicia and background to the graphic elements is represented by background pel-indicating indicia and wherein said indicia are juxtaposed in a predetermined logical array pattern of said indicia for enabling a two-dimensional graphics presentation corresponding to said logical array pattern, said indicia including array pel-indicating indicia;

including the machine-implemented steps of:

scanning said indicia to identify adjacent pel-indicating indicia having the property of two indicia that respectively indicate a foreground and a background pel in overlapping relationship;

changing predetermined ones of said adjacent indicia to gray pel-indicating indicia; and supplying to an output terminal said foreground, background and gray pel-indicating indicia as a control element for later visual presentation of the graphics element.

* * * * *